(12) United States Patent
Coffey et al.

(10) Patent No.: US 8,181,485 B2
(45) Date of Patent: May 22, 2012

(54) ROLL-TO-ROLL GLASS SOOT SHEET SINTERING METHOD AND APPARATUS

(75) Inventors: Calvin Thomas Coffey, Watkins Glen, NY (US); Daniel Warren Hawtof, Corning, NY (US); Stanley Zinn, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 424 days.

(21) Appl. No.: 12/487,923

(22) Filed: Jun. 19, 2009

(65) Prior Publication Data

US 2010/0319401 A1    Dec. 23, 2010

(51) Int. Cl.
C03B 13/00 (2006.01)
C03B 19/06 (2006.01)

(52) U.S. Cl. ............................................. 65/90; 65/253
(58) Field of Classification Search ............ 65/413–423, 65/90–101, 253
See application file for complete search history.

(56) References Cited

U.S. PATENT DOCUMENTS

| | | | |
|---|---|---|---|
| 3,806,570 A | 4/1974 | Flamenbaum et al. | 264/66 |
| 3,844,751 A | 10/1974 | Stewart | 65/4 |
| 4,082,526 A * | 4/1978 | Estes et al. | 65/24 |
| 5,922,100 A | 7/1999 | Cain et al. | 65/531 |
| 6,263,706 B1 | 7/2001 | Deliso et al. | 65/397 |
| 6,606,883 B2 | 8/2003 | Hrdina et al. | 65/17.4 |
| 6,736,633 B1 | 5/2004 | Dawson-Elli et al. | 431/328 |
| 6,743,011 B2 | 6/2004 | Bakshi et al. | 431/328 |
| 6,837,076 B2 | 1/2005 | Hawtof | 65/413 |
| 7,299,657 B2 * | 11/2007 | Kohli | 65/17.6 |
| 7,677,058 B2 * | 3/2010 | Hawtof et al. | 65/17.4 |
| 2004/0007019 A1 * | 1/2004 | Kohli | 65/17.6 |
| 2007/0130995 A1 * | 6/2007 | Hawtof et al. | 65/377 |
| 2008/0280057 A1 * | 11/2008 | Hawtof et al. | 427/450 |
| 2010/0291346 A1 * | 11/2010 | Hawtof et al. | 428/141 |
| 2011/0014445 A1 * | 1/2011 | Hawtof | 428/220 |

FOREIGN PATENT DOCUMENTS

| | | |
|---|---|---|
| EP | 476693 A2 | 9/1991 |
| JP | 9-286621 | 11/1997 |
| JP | 09286621 A * | 11/1997 |
| WO | 2005/024908 | 3/2005 |
| WO | 2007/075138 A1 | 7/2007 |
| WO | 2008/136924 A1 | 11/2008 |

OTHER PUBLICATIONS

Ichinokura JP09-286621 machine translation provided by: http://dossier1.ipdl.inpit.go.jp/AIPN/odse_top_fwi.ipdl?N0000=7401 on Nov. 6, 2011.*
"The Achille Heel of a Wonderful Material: Toughened glass", www.glassonweb.com.

* cited by examiner

Primary Examiner — Matthew Daniels
Assistant Examiner — Jodi C Franklin
(74) Attorney, Agent, or Firm — Michael W. Russell

(57) ABSTRACT

An ultra-thin glass sheet is formed using a roll-to-roll glass soot deposition and sintering process. The sintering involves initially heating and sintering one or more central segments of a glass soot sheet, and progressively heating and sintering glass soot sheet segments that are located laterally or axially adjacent to previously-sintered segments such that, along respective width directions of the glass soot sheet, only a portion of the width is sintered at a given time interval during the heating.

6 Claims, 2 Drawing Sheets

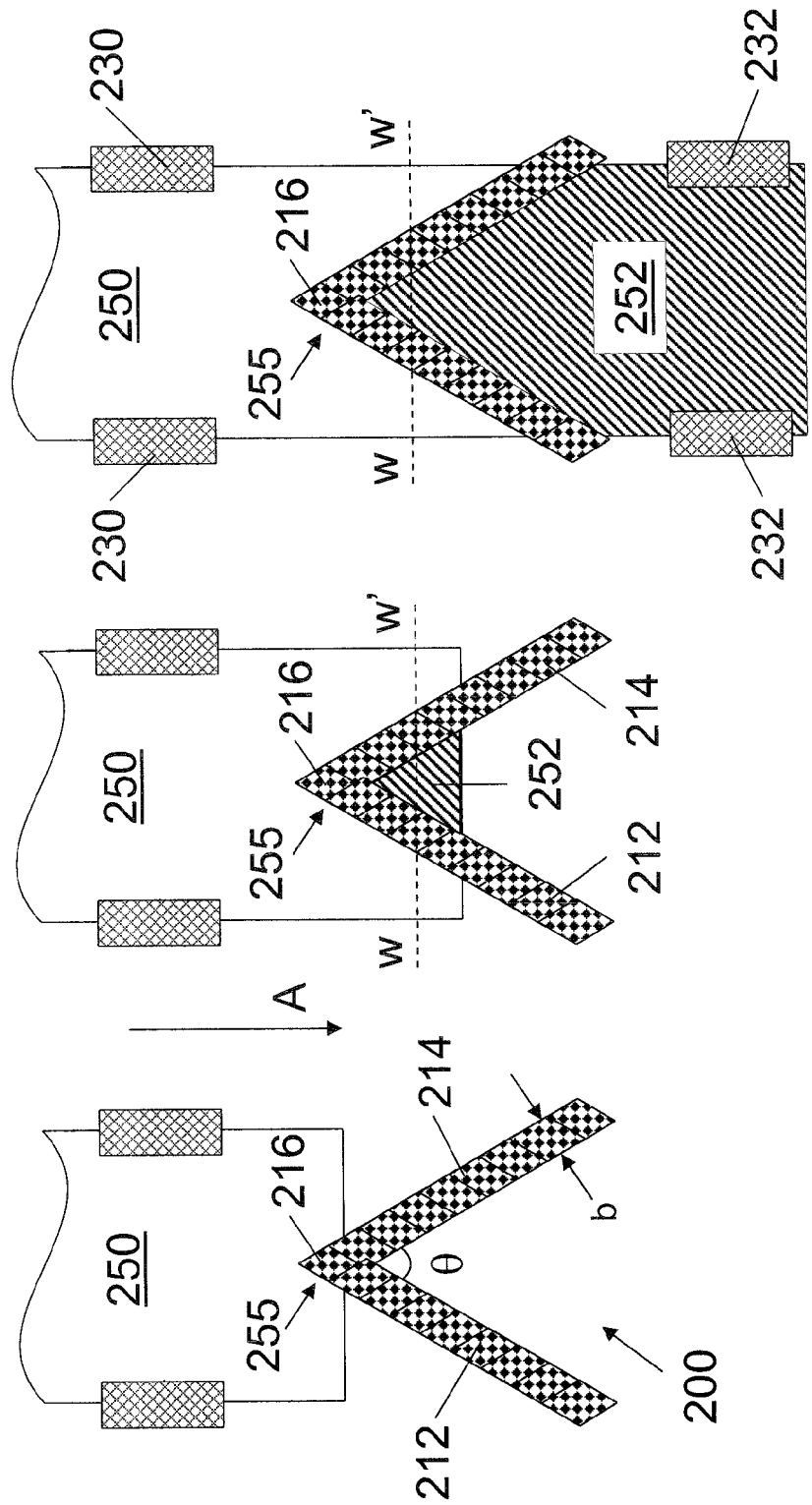

ROLL-TO-ROLL GLASS SOOT SHEET SINTERING METHOD AND APPARATUS

BACKGROUND AND SUMMARY

The present disclosure relates generally to glass sheets and more specifically to a sintering method and apparatus for forming uniform glass sheets such as silica glass sheets using a glass soot deposition process.

Glass sheet materials can be formed using a variety of different methods. In a float glass process, for example, a sheet of solid glass is made by floating molten glass on a bed of molten metal. This process can be used to form glass sheets having uniform thickness and very flat surfaces. However, float glass processes necessarily involve direct contact between the glass melt and the molten metal, which can lead to undesired contamination at the interface and less than pristine surface quality. In order to produce high quality float glass sheets with pristine surface properties on both major surfaces, float glass is typically subjected to surface polishing steps, which add additional expense. Moreover, it is believed that the float process has not been used to make ultra-thin, rollable glass sheets.

An additional method for forming glass sheet materials is the fusion draw process. In this process, molten glass is fed into a trough called an "isopipe," which is overfilled until the molten glass flows evenly over both sides. The molten glass then rejoins, or fuses, at the bottom of the trough where it is drawn to form a continuous sheet of flat glass. Because both major surfaces of the glass sheet do not directly contact any support material during the forming process, high surface quality in both major surfaces can be achieved.

Due to the dynamic nature of the fusion draw process, the number of glass compositions suitable for fusion draw processing is limited to those that possess the requisite properties in the molten phase (e.g., liquidus viscosity, strain point, etc.). Further, although relatively thin glass sheets can be made via fusion draw, the process cannot be used to form ultra-thin, rollable high-silica glass sheets. Finally, the apparatus used in the fusion draw process can be expensive.

In addition to their limitations with respect to ultra-thin glass sheet materials, both float and fusion draw processes are largely impractical sheet-forming methods for high-silica glass sheets due to the high softening point (~1600° C.) of silica. Rather, silica glass substrates are typically produced by cutting, grinding and polishing silica ingots produced in batch flame-hydrolysis furnaces. Such a batch approach is extremely expensive and wasteful. Indeed, the requisite slicing and polishing that would be needed to produce uniform, thin, flexible silica glass sheets via flame-hydrolysis would render the process prohibitively expensive. Using known methods, Applicants believe that it is not currently feasible to form and polish both sides of a high-silica glass sheet having a thickness of less than 150 microns.

In view of the foregoing, economical, uniform, ultra-thin, flexible, rollable glass sheets having a high surface quality are highly desirable. The glass sheets can comprise one or more layers, components, or phases. Such glass sheets can be used, for example, as photo mask substrates, LCD image mask substrates, and the like.

A method of forming glass sheets involves a glass soot deposition and sintering process. According to various embodiments, the sintering involves passing a glass soot sheet through a sintering zone of a sintering furnace and heating localized segments of the glass soot sheet to a temperature effective to sinter the glass soot sheet and form an ultra-thin glass sheet. In the foregoing embodiments, the heating comprises initially heating and sintering one or more central segments of the glass soot sheet, and progressively heating and sintering glass soot sheet segments located laterally or axially adjacent to previously-sintered segments. In this way, only a portion of the width of the glass soot sheet along respective width directions is sintered at a given time interval during the heating.

A high-silica glass sheet made using the foregoing sintering approach can have an average thickness of 150 microns or less and an average surface roughness over at least one of two major opposing surfaces of 1 nm or less.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

FIGS. 2A-2C are schematic illustrations of an apparatus for sintering glass soot sheets.

DETAILED DESCRIPTION

Figure 1:
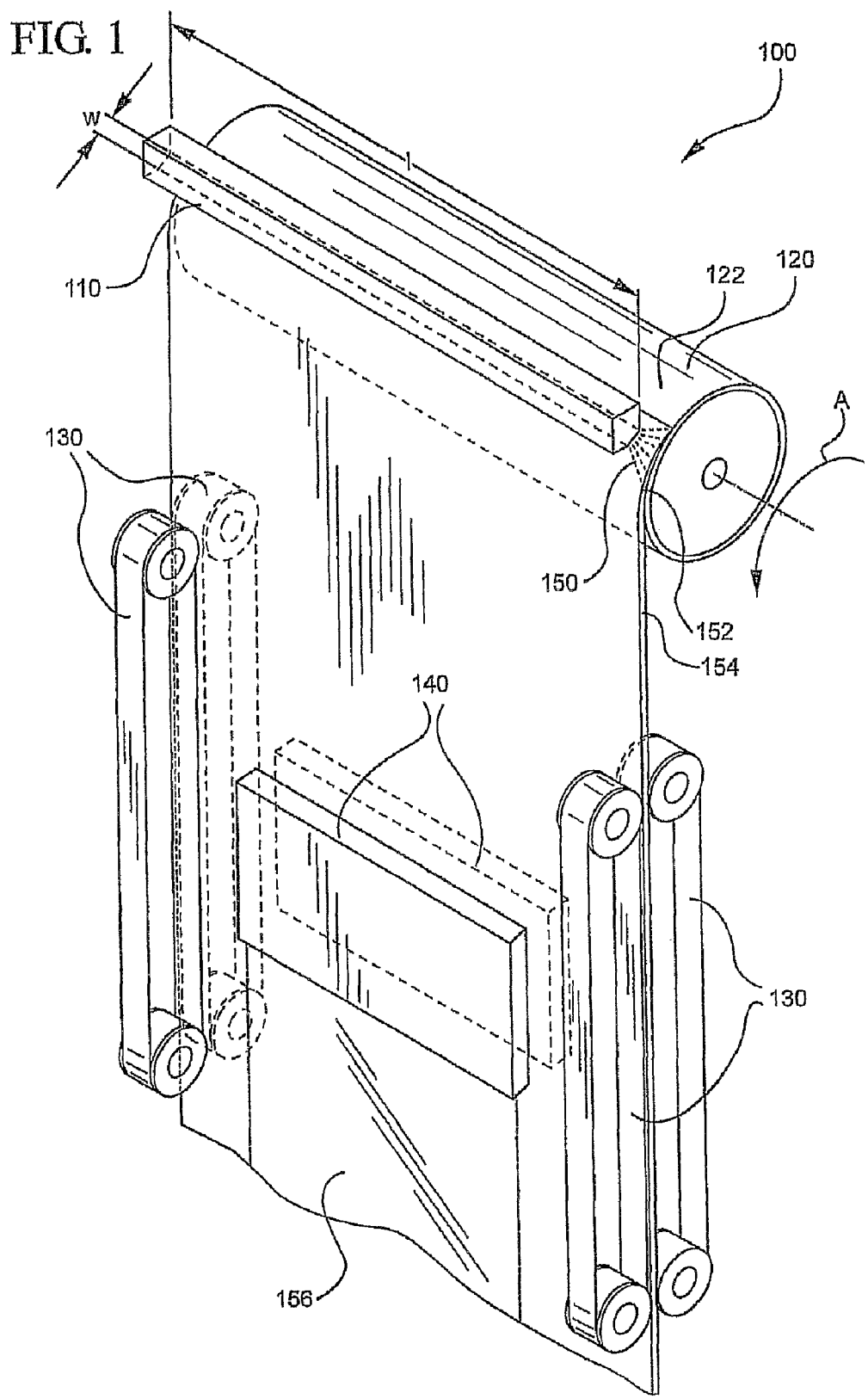
FIG. 1 is a schematic illustration of an apparatus for forming an ultra-thin glass sheet.

An apparatus for forming ultra-thin glass sheets is shown schematically in FIG. 1. The apparatus 100 comprises a soot-providing device 110, a soot-receiving device 120, a soot sheet-guiding device 130, and a soot sheet-sintering device 140.

Glass soot particles formed by the soot-providing device 110 are deposited on a deposition surface 122 of the soot-receiving device 120. The soot-receiving device 120 is in the form of a rotatable drum or belt and thus can comprise a continuous deposition surface 122. The deposited soot particles 150 form a soot layer 152 on the deposition surface 122. The soot layer 152, once formed, can be released from the deposition surface 122 as a free-standing, continuous soot sheet 154. The act of releasing the soot layer 152 from the deposition surface 122 can occur without physical intervention due to, for example, thermal mismatch, a mismatch in coefficients of thermal expansion between the soot layer and the deposition surface and/or under the effect of the force of gravity. After the soot sheet 154 is released from the soot-receiving device 120, a soot sheet-guiding device 130 can guide movement of the soot sheet 154 through a soot sheet-sintering device 140, which sinters and consolidates the soot sheet 154 to form an ultra-thin glass sheet 156.

A process of forming an ultra-thin glass sheet comprises providing a plurality of glass soot particles, depositing the glass soot particles on a deposition surface of a soot-receiving device to form a soot layer, releasing the soot layer from the soot-receiving surface to form a soot sheet, and sintering the soot sheet to form a glass sheet. Additional aspects of the process and apparatus are disclosed in detail herein below.

Although a variety of devices may be used to form glass soot particles, by way of example, the soot providing device 110 may comprise one or more flame hydrolysis burners, such as those used in outside vapor deposition OVD, vapor axial deposition (VAD) and planar deposition processes. Suitable burner configurations are disclosed in U.S. Pat. Nos. 6,606,883, 5,922,100, 6,837,076, 6,743,011 and 6,736,633, the contents of which are incorporated herein by reference in their entirety.

The soot-providing device 110 may comprise a single burner or multiple burners. An example burner has an output surface having length l and width w. The output surface comprises N columns of gas orifices where N can range from 1 to 20 or more. In an embodiment, each orifice comprises a 0.076 cm diameter hole. The length l of the output surface can range from about 2.5 to 30.5 cm or more, and the width can range from 0.1 to 7.5 cm. Optionally, multiple burners can be configured into a burner array that can produce a substantially continuous stream of soot particles over the width of the array.

A burner array, for example, may comprise a plurality of individual burners (e.g., placed end-to-end) configured to form and deposit a temporally and spatially uniform layer of glass soot. Thus, the soot-providing device can be used to form a layer of soot having a substantially homogeneous chemical composition and a substantially uniform thickness. By "uniform composition" and "uniform thickness" is meant that the composition and thickness variation over a given area is less than or equal to 20% of an average composition or thickness. In certain embodiments, one or both of the compositional and thickness variation of the soot sheet can be less than or equal to 10% of their respective average values over the soot sheet.

An example burner comprises 9 columns of gas orifices. During use, according to one embodiment, the centerline column (e.g., column 5) provides a silica gas precursor/carrier gas mixture. The immediately adjacent columns (e.g., columns 4 and 6) provide oxygen gas for stoichiometry control of the silica gas precursor. The next two columns on either side of the centerline (e.g., columns 2, 3, 7 and 8) provide additional oxygen, the flow rate of which can be used to control stoichiometry and soot density, and provide an oxidizer for the ignition flame. The outermost columns of orifices (e.g., columns 1 and 9) can provide an ignition flame mixture of, for example, $CH_4/O_2$ or $H_2/O_2$. Example gas flow rate ranges for a 9 column linear burner are disclosed in Table 1.

TABLE 1

Example gas flow rates for 9 column linear burner

| Gas | Burner column(s) | Example flow rate |
| --- | --- | --- |
| OMCTS | 5 | 15 g/min |
| $N_2$ | 5 | 40 SLPM |
| $O_2$ | 4, 6 | 18 SLPM |
| $O_2$ | 2, 3, 7, 8 | 36 SLPM |
| $CH_4$ | 1, 9 | 36 SLPM |
| $O_2$ | 1, 9 | 30 SLPM |

The soot-providing device may be held stationery during formation and deposition of the soot particles or, alternatively, the soot-providing device may be moved (e.g., oscillated) with respect to the deposition surface. A distance from the burner output surface to the deposition surface can range from about 20 mm to 100 mm (e.g., 20, 25, 30, 35, 40, 45, 50, 55, 60, 65, 70, 75, 80, 85, 90, 95 or 100 mm).

Operation of the soot-providing device typically involves chemical reactions between precursor chemicals (e.g., gaseous compounds) to form glass soot particles. Optionally, the chemical reactions can be further assisted by supplemental energy sources such as plasma or a supplemental heating device.

Silicon-containing precursor compounds, for example, can be used to form soot sheets comprising silica soot particles that can be sintered to form silica glass sheets. An example silicon-containing precursor compound is octamethylcyclotetrasiloxane (OMCTS). OMCTS can be introduced into a burner or burner array together with $H_2$, $O_2$, $CH_4$ or other fuels where it is oxidized and hydrolyzed to produce silica soot particles. Although the process of forming a glass sheet typically comprises forming a high-silica glass sheet, the process and apparatus can be used to form other glass sheet materials as well.

As-produced or as-deposited, the soot particles may consist essentially of a single phase (e.g., a single oxide) such as in the example of un-doped, high-purity silica glass. Alternatively, the soot particles may comprise two or more components or two or more phases, such as in the example of doped silica glass. For instance, multiphase high-silica glass sheets can be made by incorporating a titanium oxide precursor or a phosphorous oxide precursor into the OMCTS gas flow. Example titanium and phosphorous oxide precursors include various soluble metal salts and metal alkoxides such as halides of phosphorous and titanium (IV) isopropoxide.

In the example of a flame hydrolysis burner, doping can take place in situ during the flame hydrolysis process by introducing dopant precursors into the flame. In a further example, such as in the case of a plasma-heated soot sprayer, soot particles sprayed from the sprayer can be pre-doped or, alternatively, the sprayed soot particles can be subjected to a dopant-containing plasma atmosphere such that the soot particles are doped in the plasma. In a still further example, dopants can be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements.

The soot particles can have an essentially homogeneous composition, size and/or shape. Alternatively, one or more of the composition, size and shape of the soot particles can vary. For example, soot particles of a main glass component can be provided by a first soot-providing device, while soot particles of a dopant composition can be provided by a second soot-providing device. In certain embodiments, soot particles can mix and/or adhere to one another during the acts of forming and depositing the soot particles to form composite particles. It is also possible that the soot particles are substantially prevented from adhering to each other to form mixed particles prior to or while being deposited on the deposition surface.

Referring still to FIG. 1, deposition surface 122 comprises a peripheral portion of the soot-receiving device 120 and can be formed of a refractory material. In an embodiment, the deposition surface 122 is formed of a material that is chemically and thermally compatible with both the soot particles 150 and the deposited soot layer 152, and from which the soot layer can be easily removed. Example soot-receiving devices 120 comprise a coating or cladding of a refractory material (e.g., silica, silicon carbide, graphite, zirconia, etc.) formed over a core material of, for example, steel, aluminum or metal alloy. Further soot-receiving devices can comprise a unitary part consisting essentially of a suitable refractory material such as quartz.

The soot-receiving device 120 and particularly the deposition surface 122 can be configured in a variety of different ways and have a variety of shapes and/or dimensions. For example, a width of the deposition surface can range from about 2 cm to 2 m, although smaller and larger dimensions are possible. A cross-sectional shape of the soot-receiving device 120 can be circular, oval, elliptical, triangular, square, hexagonal, etc., and a corresponding cross-sectional dimension (e.g., diameter or length) of the soot-receiving device 120 can also vary. For example, a diameter of a soot-receiving device having a circular cross section can range from about 2 cm to 50 cm. An example soot-receiving device 120 comprises a quartz cylinder having a 250 mm inner diameter, a 260 mm outer diameter, and a 24 cm wide deposition surface.

In the examples of circular or oval cross-sections, the deposition surface 122 can comprise a closed, continuous surface, while in the examples of elliptical, triangular, square or hexagonal cross-sections, the deposition surface can comprise a segmented surface. By appropriately selecting the size and dimensions of the soot-receiving device 120, a continuous or semi-continuous soot sheet can be formed.

The deposition surface 122 can include regular or irregular patterning in the form of raised or lowered protrusions across a range of length scales. The patterning can range from one or more discrete facets to a general roughing of the surface. Thus, a deposited soot layer can conform to the patterning in the deposition surface. The pattern formed in the soot surface can be retained in the deposited surface of the soot sheet as it is separated from the deposition surface and, in turn, preserved in the sintered surface of the resulting glass sheet resulting in an embossed glass sheet. In a variation of the above-described deposition surface-derived embossing, one or both of the deposited surface and the free surface of a soot sheet can be patterned after it is removed from the deposition surface but prior to sintering. For example, Applicants have patterned a soot sheet surface with a fingerprint. Upon sintering of the soot sheet, the fingerprint pattern is retained in the resulting glass sheet.

In certain embodiments, the soot-receiving device 120 is rotated during the act of depositing soot particles 150 in order to form a soot layer 152 thereon. The rotation can be unidirectional, e.g., clockwise or counter-clockwise. A direction of rotation according to one embodiment is indicated by arrow A in FIG. 1. Optionally, the soot-receiving device may oscillate during the soot deposition process, i.e., the rotation direction may change intermittently. A linear velocity of the deposition surface 122 of the soot-receiving device 120 can range from 0.1 mm/sec to 10 mm/sec (e.g., 0.1, 0.2, 0.5, 1, 2, 3, 4, 5 or 10 mm/sec). In scale-up, it is believed that the linear velocity of the deposition surface can be increased up to 1 m/sec or higher.

Soot particles 150 are deposited on only a portion of the deposition surface 122, and the deposited soot layer 152 is removed to form a free-standing continuous or semi-continuous soot sheet 154 having length L. As illustrated in FIG. 1, a width of the deposited layer 152 (and nominally of the soot sheet 154) is W.

In certain embodiments, the soot sheet can be continuously formed on and continuously removed from the deposition surface. During formation of a soot layer, soot particles bond to a certain degree with each other and with the deposition surface. The higher the average temperature of the soot particles when they are being deposited, the more likely they are to bond with each other and form a dense and mechanically robust soot sheet. However, higher deposition temperatures also promote bonding between the soot particles and the deposition surface, which can interfere with releasing of the soot sheet. To obtain a substantially uniform temperature across the deposition surface, the soot-receiving device can be heated or cooled either from the inside, the outside, or both.

Bonding between soot particle and the deposition surface can be controlled by controlling a temperature gradient between a location where the soot particles are deposited and a location where the soot layer is released to form a soot sheet. For instance, if the soot layer and the deposition surface have sufficiently different coefficients of thermal expansion (CTEs), the release may occur spontaneously due to stress caused by the temperature gradient. In certain embodiments, removal of the deposited soot layer from the deposition surface can be made easier by forming a soot layer having a width W that is less than the width of the deposition surface 122.

During the act of separating the soot layer from the deposition surface, a direction of motion of the separated soot sheet can be substantially tangential to a release point on the deposition surface. By "substantially tangential" is meant that the direction of motion of the soot sheet relative to a release point on the deposition surface deviates by less than about 10 degrees (e.g., less than 10, 5, 2 or 1 degrees) from a direction that is tangential to the deposition surface at the release point. Maintaining a substantially tangential release angle can reduce the stress exerted on the soot sheet at the release point.

For a soot-receiving device having a circular or oval cross section, the curvature of the deposition surface is a function of the cross-sectional diameter(s) of the soot-receiving device. As the diameter increases, the radius of curvature increases, and stresses in the deposited soot decrease as the shape of the deposited soot sheet approaches that of a flat, planar sheet.

In embodiments, the soot sheet has sufficient mechanical integrity to support its own mass (i.e., during the acts of removal from the deposition surface, handling and sintering) without fracturing. Process variables that can affect the physical and mechanical properties of the soot sheet include, inter alia, the thickness and density of the soot sheet, the curvature of the deposition surface, and the temperature of the soot sheet during formation.

The soot sheet comprises two major surfaces, only one of which contacts the deposition surface during formation of the soot layer. Thus, the two major surfaces of both the soot sheet and the sintered glass sheet derived therefrom may be characterized and distinguished as the "deposited surface" and the opposing "free surface."

In an example of a soot sheet comprising at least 90 mole % silica, an average soot density of the soot sheet can range from about 0.3 to 1.5 $g/cm^3$, e.g., from about 0.4 to 0.7 $g/cm^3$, or from about 0.8 to 1.25 $g/cm^3$, and an average thickness of the soot sheet can range from 10 to 600 μm, e.g., 20 to 200 μm, 50 to 100 μm or 300 to 500 μm.

In certain embodiments, particularly those involving continuous soot sheet and/or sintered glass sheet production, continuous movement of the soot sheet away from the deposition surface after its release can be aided by a soot sheet guiding device 130. The soot sheet guiding device 130 can directly contact at least a portion of the soot sheet 154 in order to aid movement and provide mechanical support for the soot sheet.

To maintain a high surface quality of the soot sheet, the soot sheet guiding device 130 may contact only a portion (e.g., an edge portion) of the soot sheet 154. In certain embodiments, the soot sheet guiding device comprises a pair of clamping rollers that can grip an edge portion of the soot sheet and guide the soot sheet through a soot sheet sintering device.

Using a soot sheet guiding device, a continuous soot sheet can be fed into a sintering/annealing zone of a soot sheet sintering device 140 where at least a portion of the soot sheet is heated at a temperature and for a period of time sufficient to convert the heated portion into densified glass. For example, a soot sheet of high purity silica can be sintered at a temperature ranging from about 1000° C. to 1900° C., e.g., from about 1400° C. to 1600° C. to form an ultra-thin silica glass sheet 156. The sintering temperature and the sintering time can be controlled in order to form a sintered glass sheet that is essentially free of voids and gas bubbles.

As used herein, sintering refers to a process whereby glass soot particles are heated below their melting point (solid state sintering) until they adhere to each other. Annealing is a process of cooling glass to relieve internal stresses after it was formed. Sintering and annealing can be carried out sequentially using the same or different apparatus.

The glass sheet formation process may be controlled in order to minimize strain (e.g., sagging) of both the soot sheet and the resulting glass sheet. One way to minimize strain is to orient the soot sheet substantially vertically during sintering. According to embodiments, an angle of orientation of the soot sheet with respect to a vertical orientation can be less than 15 degrees (e.g., less than 10 or 5 degrees).

The sintering involves passing a glass soot sheet through a sintering zone of a sintering furnace and successively heating and sintering localized segments of the glass soot sheet. Initially, one or more central segments of the glass soot sheet are heated. Central segments are bounded in the width direction by unsintered glass soot. After the initial central segment sintering, the localized heating and attendant sintering are extended across the remaining unsintered glass soot in a manner such that each successively sintered segment is adjacent to a previously-sintered segment. Thus, a sintering front, which represents a boundary between sintered and unsintered material, advances across the soot sheet until it reaches an edge of the soot sheet or another sintering front. According to an embodiment, a length of a sintering front continuously changes during the sintering. According to a further embodiment, the glass soot sheet is heated and sintered across at least 90% of its width (e.g., across its entire width).

A suitable soot sheet-sintering device for conducting the sintering can include one of a variety of designs. One feature of the designs may be the ability to sinter only a portion of the glass soot sheet width at any given time such that the segment being sintered can be in contact with and thus be supported by (e.g., tensioned by) either previously-sintered soot or unsintered glass soot sheet along a width direction. Additional aspects of the sintering method and of suitable soot sheet-sintering devices are disclosed in FIG. 2.

FIG. 2 is a schematic illustration of a soot sheet-sintering device for sintering glass soot sheets according to one embodiment. The soot sheet-sintering device 200 is shaped as a chevron having first and second legs 212 and 214 that are joined at an apex 216. The legs 212 and 214 each have a breadth b and intersect at an angle of intersection θ. A temperature of the soot sheet-sintering device can be controlled to be spatially or temporally uniform or non-uniform. Thus, by way of example, both legs can have a constant temperature throughout a sintering step. By way of an additional example, or one or both of an inter-leg or intra-leg temperature may be varied either spatially or temporally during a sintering process.

During sintering, when the glass soot sheet is moved relative to the soot sheet-sintering device, the chevron-shaped soot sheet-sintering device can be oriented such that the apex 216 constitutes a leading edge of the sintering zone. In FIG. 2, a direction of motion of the soot sheet 250 is indicated by arrow A. As the soot sheet 250 is moved into the sintering zone, a central segment 255 of the soot sheet is located proximate to the apex 216 and the central segment 255 is initially heated and sintered. As the soot sheet 250 continues to move, soot sheet segments that are positioned laterally adjacent and axially adjacent to the previously-sintered segments pass successively through the sintering zone. This process can continue until the whole of the glass soot sheet 250 is sintered to form sintered glass soot sheet 252. During the sintering, however, only localized segments (e.g., localized segments along the soot sheet width) are sintered at any given time. In this way, only a portion of the width of the glass soot sheet along respective width directions (e.g., along a line w-w') is sintered at a given time interval during the heating.

In FIGS. 2A-2C, the localized segments of the glass soot sheet that are sintered within a sintering zone are proximate to and thus are obscured by the soot sheet-sintering device 200. In contrast to most conventional sintering approaches wherein a sintering front is oriented substantially orthogonal with respect to a direction of motion of a workpiece through a sintering zone, according to present embodiments, a sintering front is oriented at an acute angle with respect to a direction of motion of the glass soot sheet through the sintering zone. In this manner, the segments being heated and sintered are bounded and thus tensioned laterally by unsintered soot and/or previously-sintered soot. This in situ self-tensioning during sintering, which can be accomplished without physical contact by a tensioning device, can substantially inhibit lateral shrinkage of the sintered glass soot sheet 252. One skilled in the art would appreciate that the dimensions and shape of the soot sheet-sintering device and hence the sintering zone can be optimized to control the sintering profile and stress pattern within the sintering glass soot sheet.

A soot sheet guiding device 230 can be used to guide the soot sheet 250 into the sintering zone. A glass sheet guiding device 232 can be used to guide the glass sheet as it emerges from the sintering zone.

A variety of different soot sheet-sintering devices such as resistive heating and induction heating devices can be used to sinter the soot sheet. The thermal history of both the soot sheet and the glass sheet can affect the final thickness, composition, compositional homogeneity and other chemical and physical properties of the final product. A glass sheet can be formed by applying heat to one or both of the major surfaces of the soot sheet. During sintering, various parameters can be controlled including temperature and temperature profile, time, and atmosphere.

Though a sintering temperature can be selected by skilled artisan based on, for example, the composition of the soot sheet to be sintered, a sintering temperature can range from about 1000° C. to 1900° C. Further, a homogeneous temperature profile, which is achievable with both resistive and induction heating sources, can be used to create homogeneity within the final glass sheet. By "homogeneous temperature profile" is meant a sintering temperature that varies by less than 20% (e.g., less than 10 or 5%) over a predetermined sample area or sample volume.

In embodiments where an edge portion of the soot sheet is held and guided by the soot sheet-guiding device, that edge portion is typically not sintered by the sintering device. For example, in one embodiment, the center 10 cm of a soot sheet having an average thickness of about 400 microns and a total width of 24 cm was heated to produce a sintered glass sheet having a width of about 10 cm and an average thickness of about 100 microns. Prior to sintering, an average density of the soot sheet is about 0.5 g/cm$^3$.

In addition to controlling the temperature and the temperature profile during sintering, the gas ambient surrounding the soot sheet/glass sheet can also be controlled. Specifically, both the total pressure as well as the partial pressure of suitable sintering gases can be selected in order to control the sintering process. In certain embodiments, a controlled gas mixture can comprise one or more active or inert gases such as, for example, He, $O_2$, CO, $N_2$, Ar or mixtures thereof.

During the act of sintering, the soot sheet may be held stationery within a sintering zone or moved continuously or semi-continuously through such a zone. For example, in a continuous glass sheet forming process, a rate of production of the soot sheet as it is released from the soot deposition surface may be substantially equal to a rate of translation of the soot sheet through the sintering zone. Sintering may be performed via one or more passes through a sintering zone using the same or different sintering conditions. A linear velocity of the soot sheet through the sintering zone can range from 0.1 mm/sec to 10 mm/sec (e.g., 0.1, 0.2, 0.5, 1, 2, 3, 4, 5 or 10 mm/sec). In scale-up, it is believed that the linear velocity of the deposition surface can be increased up to 1 m/sec or higher. A distance from the heater to the soot surface can range from about 1 mm to 10 mm (e.g., 1, 2, 3, 4, 5, 6, 7, 8, 9 or 10 mm).

Once formed, the glass sheet may be divided into discrete pieces by a suitable cutting device. For example, a laser can be used to cut the glass sheet into smaller pieces. Further, before or after cutting, the sintered glass can be subjected to one or more post-sintering processes, such as edge removal, coating, polishing, etc. A long ribbon of sintered glass sheet can be reeled by a reeling device into a roll. Optionally, spacing materials such as paper sheet, cloth, coating materials, etc. can be inserted in between adjacent glass surfaces in the roll to avoid direct contact there between.

The process and apparatus disclosed herein are suited for making soot sheets and sintered glass sheets comprising a high percentage of silica, e.g., "high-silica" glass sheets. By "high-silica" is meant a glass composition comprising at least 50 mole % silica glass, e.g., greater than 50, 55, 60, 65, 70, 75, 80, 85, 90, 95, 98, 99, 99.5 or 99.9 mole % silica.

Flexible sintered glass sheets, including long glass ribbons, can be formed. Sintered glass sheets such as high-silica glass sheets can have an average thickness of 150 microns or less (e.g., less than 150, 100, 50, or 25 microns). Example glass sheets have a thickness of 10, 30, 50 or 100 µm. By controlling width of the deposited soot layer, the width of the sintering zone, and the amount of deposition time, it is possible to independently control both the width and the length of sintered glass sheets. A length of the glass sheet can range from about 2.5 cm to 10 km. A width of the glass sheet can range from about 2.5 cm to 2 m.

The process can be used to form high surface quality glass sheets (e.g., glass sheets having low surface waviness, low surface roughness, and which are essentially free from scratches). The above-disclosed process, which can include an initial step of forming a soot sheet on a roll, and a final step of reeling a sintered, flexible glass sheet onto a roll, can be referred to as a "roll-to-roll" process. The resulting glass sheets, including high-silica glass sheets, can be characterized by a number of properties including composition, thickness, surface roughness, surface uniformity and flatness.

As used herein, "soot layer" or "layer of soot" refers to a stratum of essentially homogeneously-distributed glass particles that are optionally bonded with each other. The layer generally has an average total thickness that is greater than or equal to an average diameter of individual particles. Further, a soot layer may comprise a single soot layer having an essentially homogeneous composition or multiple soot layers each having an essentially homogeneous composition.

In embodiments where the soot layer comprises multiple layers, one species of glass particles can form a first soot layer, while a second species of glass particles can form a second soot layer adjacent to the first soot layer. Thus, respective soot layers can have distinctive compositional and/or other properties. Moreover, in an interfacial region between the first and second layers, blending of the two species of particles can occur such that the composition and/or properties at the interface of contiguous layers may deviate from the bulk values associated with each respective layer.

Reference herein to a "glass sheet" includes both sheet materials comprising a plurality of glass soot particles (i.e., soot sheets) and sheet materials made of sintered glass. As is typically understood in the art, a sheet has two major opposing surfaces that are typically substantially parallel to each other, each having an area larger than that of other surfaces. A distance between the two major surfaces at a certain locations is the thickness of the sheet at that particular location. A sheet may have a substantially uniform thickness between the major surfaces, or the thickness can vary spatially either uniformly or non-uniformly. In certain other embodiments, the two major surfaces can be non-parallel, and one or both of the major surfaces can be planar or curved.

As used herein, "sintered glass" refers to a glass material having a density of at least 95% of a theoretical density (Dmax) for a glass material having the same chemical composition and microstructure under conditions of standard temperature and pressure (STP) (273 K and 101.325 kPa). In certain embodiments, it is desired that the sintered glass has a density of at least 98%, 99% or 99.9% of Dmax under STP.

Additional aspects of ultra-thin glass sheet formation using a glass soot deposition and sintering process are disclosed in commonly-owned U.S. application Ser. Nos. 11/800,585 and 12/466,939, filed May 7, 2007 and May 15, 2009, respectively, the contents of which are incorporated herein by reference in their entirety.

As used herein, the singular forms "a," "an" and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" in a particular way. In this respect, such a component is "configured" to embody a particular property, or function in a particular manner, where such recitations are structural recitations as opposed to recitations of intended use. More specifically, the references herein to the manner in which a component is "configured" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of forming an ultra-thin glass sheet, the method comprising:
   providing a glass soot sheet and a sintering furnace, the glass soot sheet having a length, a width, and two opposing primary surfaces separated by a thickness, and the sintering furnace having a heater defining a sintering zone, wherein said heater comprises a first leg and a second leg that intersect at a predetermined angle to form a V-shape;
   passing the glass soot sheet through the sintering zone by moving at least one of the glass soot sheet and the heater; and
   heating localized segments of the glass soot sheet to a temperature effective to sinter the glass soot sheet and form an ultra-thin glass sheet,
   wherein the heater is oriented relative to the glass soot sheet such that said step of heating comprises initially heating and sintering one or more central segments of the glass soot sheet, and progressively heating and sintering glass soot sheet segments located laterally or axially adjacent to previously-sintered segments such that, along respective width directions of the glass soot sheet, only a portion of the width is sintered at a given time interval during the heating.

2. The method according to claim 1, wherein the angle of intersection ranges from about 10 to 45 degrees.

3. The method according to claim 1, wherein the first and second legs have a breadth of from about 10 to 25 mm.

4. The method according to claim 1, wherein a relative translation rate of the glass soot sheet through the sintering zone is from about 0.1 to 10 mm/sec.

5. The method according to claim 1, wherein a sintering front across the glass soot sheet is oriented at an acute angle with respect to a direction of motion of the glass soot sheet through the sintering zone.

6. The method according to claim 1, wherein the glass soot sheet is heated and sintered across at least 90% of its width.

* * * * *